United States Patent
Wang et al.

(10) Patent No.: US 8,908,546 B2
(45) Date of Patent: Dec. 9, 2014

(54) DISTRIBUTED SPECTRUM SENSING

(75) Inventors: Ying Wang, Eindhoven (NL); Ashish Vijay Pandharipande, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 184 days.

(21) Appl. No.: 13/061,596

(22) PCT Filed: Aug. 27, 2009

(86) PCT No.: PCT/IB2009/053753
§ 371 (c)(1),
(2), (4) Date: Mar. 1, 2011

(87) PCT Pub. No.: WO2010/026514
PCT Pub. Date: Mar. 11, 2010

(65) Prior Publication Data
US 2011/0149791 A1   Jun. 23, 2011

(30) Foreign Application Priority Data
Sep. 4, 2008 (EP) .................................... 08163653

(51) Int. Cl.
*H04L 12/26* (2006.01)
*H04B 17/00* (2006.01)
*H04K 3/00* (2006.01)
*H04W 16/14* (2009.01)

(52) U.S. Cl.
CPC ........ *H04B 17/0045* (2013.01); *H04B 17/0047* (2013.01); *H04B 17/007* (2013.01); *H04K 3/226* (2013.01); *H04W 16/14* (2013.01)
USPC .......................................... 370/252; 370/235

(58) Field of Classification Search
CPC ... H04W 24/00; H04L 43/50; H04L 43/0852; H04L 43/08; H04B 17/003
USPC .......................................... 370/252, 235, 230
See application file for complete search history.

(56) References Cited

U.S. PATENT DOCUMENTS

| | | | | |
|---|---|---|---|---|
| 4,164,036 A | * | 8/1979 | Wax ................................. | 702/74 |
| 5,208,804 A | * | 5/1993 | Wilson et al. .................. | 370/343 |
| 5,963,562 A | * | 10/1999 | Zervos ........................... | 370/480 |
| 5,974,042 A | * | 10/1999 | Frank et al. .................... | 370/342 |
| 6,211,901 B1 | * | 4/2001 | Imajima et al. ................. | 725/93 |
| 6,266,172 B1 | * | 7/2001 | Zirngibl .......................... | 398/25 |
| 6,909,736 B2 | * | 6/2005 | Akopian et al. .............. | 375/130 |

(Continued)

FOREIGN PATENT DOCUMENTS

| | | |
|---|---|---|
| CN | 1364350 A | 8/2002 |
| WO | 2007083269 A1 | 7/2007 |

OTHER PUBLICATIONS

Donoho, D.: "Compressed Sensing"; Stanford University Department of Statistics, Sep. 14, 2004, 34 Page Document.

(Continued)

*Primary Examiner* — Michael J Moore, Jr.
*Assistant Examiner* — Siren Wei

(57) ABSTRACT

The present invention relates to a spectrum sensing scheme for a radio network. The proposed approach involves applying sensing in a distributed fashion to obtain an estimate of the signal spectrum. A network of the multiple sensing nodes (200-1 to 200-J) obtains such a spectrum estimate without requiring high-speed analog-to-digital converter to accommodate the large band-width of interest.

8 Claims, 4 Drawing Sheets

(56) References Cited

U.S. PATENT DOCUMENTS

| | | | |
|---|---|---|---|
| 7,271,747 B2 | 9/2007 | Baraniuk et al. | |
| 7,289,049 B1 * | 10/2007 | Fudge et al. | 341/123 |
| 7,345,603 B1 * | 3/2008 | Wood et al. | 341/122 |
| 2001/0038356 A1 * | 11/2001 | Frank | 343/853 |
| 2007/0027656 A1 * | 2/2007 | Baraniuk et al. | 702/189 |
| 2008/0104377 A1 * | 5/2008 | Wang et al. | 712/225 |
| 2008/0129560 A1 | 6/2008 | Baraniuk et al. | |
| 2009/0068951 A1 * | 3/2009 | Mishali et al. | 455/59 |
| 2010/0157066 A1 | 6/2010 | Challapali et al. | |

OTHER PUBLICATIONS

Bajwa et al: "Compressive Wireless Sensing"L IPSN3 06, Apr. 2006, pp. 134-142.

Tian et al: "Compressed Sensing for Wideband Cognitive Radios"; IEEE, 2007, ICASSP, pp. 1357-1360.

Tropp et al: "Signal Recovery From Random Measurements Via Orthogonal Matching Pursuit": IEEE Transactions on Information Theory, Dec. 2007, Vol. 53, No. 12, pp. 4655-4666.

Mishra et al: "Cooperative Sensing Among Cognitive Radios"; IEEE International Conference on Communications, ICC 2006, pp. 1658-1663.

Federal Communications Commission: FCC 06-103, Notice of Proposed Rulemaking, Notice of Inquiry and Order, Released Jul. 18, 2006, 29 Page Document.

Federal Communications Commission: FCC 06-156, First Report and Order and Further Notice of Proposed Rulemaking, Released Oct. 18, 2006, 43 Page Document.

Yu et al, "Mixed-Signal Parallel Compressed Sensing and Reception for Cognitive Radio", IEEE International Conference on Acoustics, Speech and Signal Processing, 2008, pp. 3861-3864.

* cited by examiner

DISTRIBUTED SPECTRUM SENSING

FIELD OF THE INVENTION

The present invention generally relates to apparatuses, methods, computer program products and a system for sensing a spectrum of a radio network.

BACKGROUND OF THE INVENTION

It is widely recognized that future wireless systems will be cognitive and be able to use radio spectrum opportunistically. There are a number of standardization bodies (e.g. Institute of Electrical and Electronics Engineers (IEEE) 802.22) and regulatory bodies (e.g. Federal Communications Commission (FCC06, FCCM06)) defining technical requirements for such systems. A central problem in such systems is to obtain spectrum occupancy in a wideband spectral region of interest. For example, the FCC is considering a spectrum in a region from 54 MHz to 862 MHz for such cognitive networks. Similar interest has arisen in a spectrum in a region from 2 GHz to 5 GHz.

In the field of spectrum estimation, a technique called "compressive sensing" has been developed recently. To estimate the spectrum an autocorrelation sequence of length N, $$r = [r(1) \ldots r(N)]^T \quad (1)$$

is required, where each entry $$r(n) = E\{x(t)x^*(t-\tau_n)\}, n=1, \ldots, N \quad (2)$$

corresponds to an autocorrelation of a received signal x(t) at a specific time delay $\tau_n = (n-1)\Delta t$. The sampling time $\Delta t$ corresponds to the inverse of a total bandwidth of the frequency band to be sensed. The length N of the autocorrelation sequence corresponds to the frequency resolution, i.e., the larger the N, the better the frequency resolution of the estimated spectrum. The spectrum can be estimated as a Fourier transform of the autocorrelation sequence r in equation (1). In matrix form, the estimated spectrum vector is:

$$r_f = Fr \quad (3)$$

where F denotes a Discrete Fourier Transform (DFT) matrix of size N×N.

An exemplary compressive sensing (CS) framework is described in D. Donoho, "Compressed sensing", IEEE Transactions on Information Theory, pp 1289-1306, April 2006. Assuming that $x \in R^N$ is a signal, and $\Psi = [\psi_1 \ldots \psi_N]$ is a basis of vectors spanning $R^N$, it can be said that x is K-sparse in $\Psi$, if x can be well approximated by a linear combination of K<<N vectors from $\Psi$. In matrix form that is:

$$x = \Psi\theta \quad (4)$$

where $\theta$ is a sparse vector containing K non-zero entries. The CS theory states that it is possible to use an M×N measurement matrix $\Phi$ where M<<N, yet the measurement y=$\Phi$x preserves the essential information about the K-sparse signal x. An example of the measurement matrix $\Phi$ is a random matrix with i.i.d. Gaussian entries. Using any matrix $\Phi$ that is incoherent with the matrix $\Psi$ of basis vectors, it is possible to recover the K-sparse signal x from the CS measurements y. The canonical formulation of a CS recovery problem is to solve the $l_1$ minimization problem:

$$\hat{\theta} = \underset{\theta}{\mathrm{argmin}} \|\theta\|_1 \quad (5)$$

$$\text{s.t. } y = \Phi x = \Phi\Psi\theta$$

This problem requires M=cK measurements where c is some constant. Iterative greedy pursuit algorithms, such as described in J. Tropp and A. Gilbert, "Signal recovery from random measurements via orthogonal matching pursuit", IEEE Transactions on Information Theory, pp 4655-4666, December 2007, are commonly used for CS recovery, e.g., the orthogonal matching pursuit (OMP) algorithm.

The signal to be estimated for spectrum sensing is the autocorrelation sequence r in equation (1), or equivalently its frequency domain version, the spectrum $r_f$ in equation (3). In order to apply CS to spectrum estimation, a sparse representation of r can be used with a sparse vector z on a basis matrix $\Psi$ such that r=$\Psi$z and z contains a lot of zero or near-zero entries.

Z. Tian and G. B. Giannakis, "Compressed Sensing for Wideband Cognitive Radios", ICASSP, pp 1357-1360, 2007 describes an edge spectrum z as a sparse representation of r. The edge spectrum can be defined as the derivative of a smoothed version of the original signal spectrum:

$$z = \frac{d}{df}(r(f) * w(f)) = \frac{d}{df} FFT\{r(t)w(t)\} \quad (6)$$

where * denotes the convolution, w(f) is a smoothing function, and w(t) is the inverse Fourier transform of w(f). The convolution of the signal spectrum r(f) with w(f) performed in frequency domain can be implemented in time domain by a multiplication of the autocorrelation sequence r(t) with w(t) and followed by a Fourier transform. In matrix form, the edge spectrum vector z is:

$$z = DFWr \quad (7)$$

where $$D = \begin{bmatrix} 1 & 0 & \ldots & 0 \\ -1 & 1 & \ddots & \vdots \\ 0 & \ddots & \ddots & 0 \\ 0 & \ldots & -1 & 1 \end{bmatrix}$$

is a matrix approximating the derivative operation, W=diag{w(t)} is a diagonal matrix with w(t) on its diagonal, the matrices D, F, and W are of size N×N, the vectors r and z are of size N×1. The edge spectrum vector z is a sparse vector with only a few non-zero entries corresponding to the edges of frequency bands where spectrum levels have some sharp changes.

FIG. 1 shows a signal spectrum r(f) (top) and the corresponding edge spectrum z(f) (bottom). It is clearly derivable that the edge spectrum is sparse in frequency domain with only a few spikes, where a positive spike indicates an increase of spectrum level and a negative spike indicates a decrease.

Based on equation (7), the autocorrelation sequence vector r can be expressed in terms of z:

$$r = (DFW)^{-1}z = \Psi z \quad (8)$$

which shows that r has a sparse representation z in the basis $\Psi = (DFW)^{-1}$.

Wideband spectrum sensing can be achieved by performing narrowband sensing on each narrowband frequency channel one at a time. However, this requires an expensive and unfavorable radio frequency (RF) front end with tunable narrowband bandpass filters and also needs knowledge of channelization, i.e., the center frequency and the bandwidth of each narrow band channel, over the wideband of interest.

Another approach is based on sensing the wideband containing multiple narrowband frequency channels at the same time. This requires high-speed and therefore power hungry analog-to-digital converters (ADC) running at e.g., Gbits/second if the total bandwidth of interest is several hundred MHz.

Z. Tian and G. B. Giannakis, "Compressed Sensing for Wideband Cognitive Radios", ICASSP, pp 1357-1360, 2007 proposed an idea of applying compressive sensing to perform wideband spectrum sensing. However, the compression is applied on the autocorrelation sequence r(t) and the calculation of r(t) requires the original wideband signal x(t) to be sampled at above the Nyquist rate, and therefore the burden of high-speed ADC is not reduced.

Furthermore, US 20080129560 discloses a method for distributed compressive sensing where use is made of a full CS matrix, or a submatrix thereof, and the main focus is on algorithmic efficiency in the recovery algorithm based on joint sparsity amongst measurements at the multiple sensor nodes.

SUMMARY OF THE INVENTION

It is an object of the present invention to provide a flexible spectrum sensing approach with reduced processing requirements at sensor nodes.

This object is achieved at a sensing side by an apparatus as claimed in claim 1 and a method as claimed in claim 9, at a measuring or processing side by an apparatus as claimed in claim 2 and a method as claimed in claim 10, and by a computer program product as claimed in claim 13.

Accordingly, spectrum estimation can be performed by a network of multiple sensor nodes in a distributed fashion and without requiring a high-speed analog-to-digital converter (ADC) to accommodate large bandwidths of interest. Each sensor node measures in the analog domain a partial autocorrelation of the received signal at several specific time delays. The analog autocorrelation thus alleviates the burden on ADCs. Each sensor node further transforms in the digital domain the partial autocorrelation to a partial compressive measurement sequence by a compressive sensing processor. The fusion center retrieves the partial compressive measurement sequences collected by all sensor nodes, based on which the signal spectrum over the total band or spectrum is estimated. Fusion may be performed at a node that is different than the sensor nodes, or performed at each sensing node by collecting measurements from other sensor nodes. The proposed distributed sensing approach is of particular advantage to distributed networks where energy efficiency is critical.

The proposed apparatuses may be implemented as processor devices, modules, chips, chip sets or circuitries provided in a network node or station. A processor may be controlled by a computer program product comprising code means for performing the steps of the claimed methods when run on a computer or processor device.

According to a first aspect, the partial compressive measurement sequences may be transmitted over a coherent additive transmission channel. Thereby, the transmission channel automatically aggregates the individual partial compressive measurement sequences transmitted by the distributed sensor nodes.

According to a second aspect which can be combined with the above first aspect, the correlator may comprise at least one branch having a multiplier for multiplying the received signal with its conjugated version of the specific delay, an integrator for integrating the obtained product over a predetermined time window, and an analog-to-digital converter for digitizing the obtained integrated output at the end of the predetermined time window. This branch-type processing structure enables a simple scalable structure of the apparatus based on the processing capabilities.

According to a third aspect which can be combined with the second aspect, the correlator may further comprise a compressive sensing processor for receiving the digitized integrated output of the at least one branch and for applying a partial compressive sensing measurement to the digitized integrated output. The compressive sensing measurement provides the advantage of reduced processing requirements due to the smaller number of signal projections to be processed.

According to a fourth aspect which can be combined with any one of the first to third aspects, the transformation processor may comprises a recovery part for recovering a derivative of the total spectrum from the collection of partial compressive measurement sequences, and an integration part for approximating an integration operation over the derivative. Thus, an estimate of the total spectrum can be obtained directly from the recovered derivative by a simple integration operation.

According to a fifth aspect which can be combined with any one of the first to fourth aspects, the recovery part may be adapted to apply a compressive sensing recovery processing. Hence, available recovery algorithms can be used for the recovery processing.

According to a sixth aspect which can be combined with the fourth or fifth aspect, the integration part may be adapted to calculate a cumulative sum over the derivative. This enables a simple and straight forward approach to obtain an approximation of the integration operation.

According to a seventh aspect which can be combined with any one of the first to sixth aspects, the number of processing branches provided in the apparatus according to claim 1 for measuring the partial auto correlation varies in dependence on a processing capability of the respective network node, and wherein the sum of all processing branches provided in all apparatuses according to claim 1 of the system corresponds to the frequency resolution of the total spectrum. Thereby, the shared burden of measuring the autocorrelation sequence of the total spectrum can be adapted to the processing capability of each individual sensing node.

Further advantageous developments are defined in the dependent claims.

BRIEF DESCRIPTION OF THE DRAWINGS

The present invention will now be described based on various embodiments with reference to the accompanying drawings in which.

DETAILED DESCRIPTION OF EMBODIMENTS

In the following, embodiments of the present invention are described on the basis of an exemplary distributed compressive wideband sensing system.

According to the embodiments, the proposed spectrum estimation of a wideband frequency channel containing multiple narrowband channels is performed by a network of multiple sensor nodes in a distributed fashion and without requiring a high-speed ADC to accommodate the large bandwidth of interest.

Each sensor node measures in the analog domain a partial autocorrelation of the received signal at several specific time delays, e.g., according to the processing capabilities of the sensor node. The analog autocorrelation alleviates the burden on ADCs. Each sensor node further transforms in the digital domain the partial autocorrelation to a partial compressive measurement sequence. A fusion center (FC) retrieves the partial compressive measurement sequences collected by all sensor nodes, based on which the signal spectrum over the wideband can be estimated via compressive sensing (CS) recovery algorithm. Fusion may be performed at a node that is different than the sensor nodes, or at each sensing node by collecting measurements from all other sensor nodes.

The proposed spectrum estimation thus involves a specific signal processing at each sensor node in the network, a specific way of communicating the sensed information from each sensor node to the FC, and a specific processing done at the fusion center to obtain the spectrum estimate.

Figure 1:
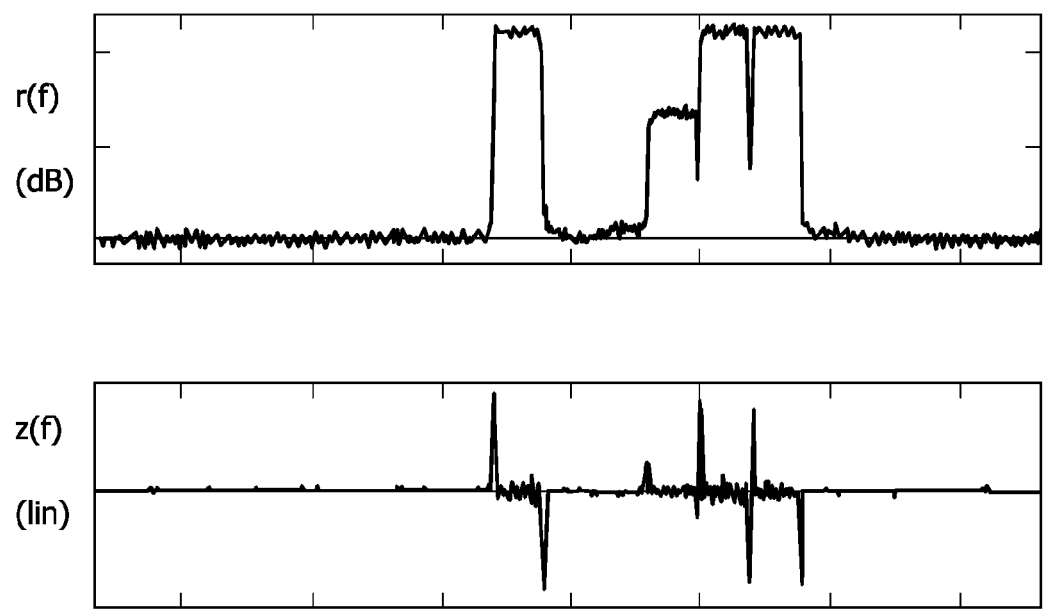
FIG. 1 shows a signal spectrum and a corresponding edge spectrum.
Figure 2:
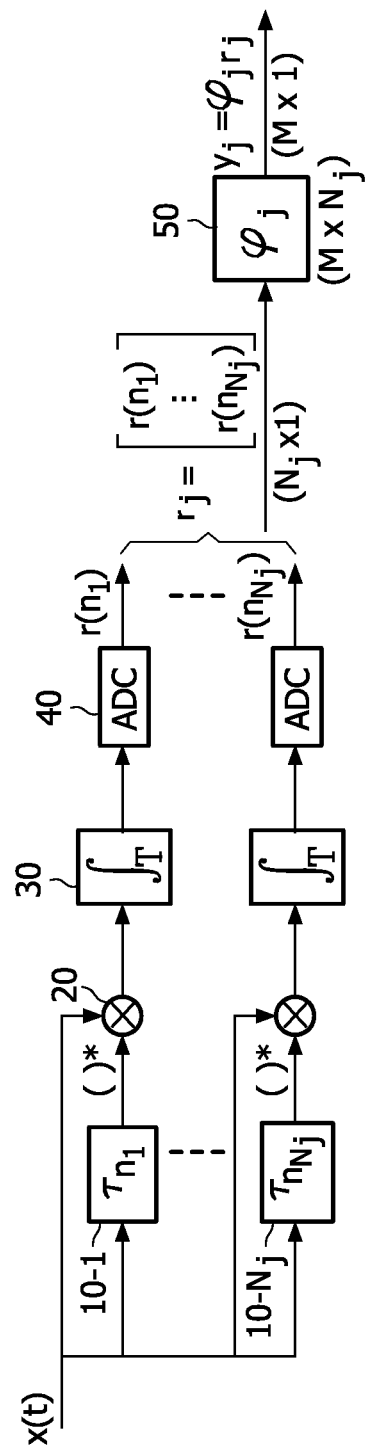
FIGS. 2 shows a schematic block diagram of a sensor node processor according to a first embodiment.

FIG. 2. shows a schematic block diagram of a processor or processing elements at a sensor node indexed by j. An autocorrelation of a received signal x(t) is measured in at least one processing branch in the analog domain by multiplying the received signal x(t) at respective multipliers 20 with its delayed conjugated version obtained from respective delay elements 10-1 to 10-$N_j$. The products at the outputs of the multipliers 20 are supplied ti respective integrators 30, where they are integrated over a predetermined time window T. At the end of each processing branch, the analog integration output is supplied to respective ADCs 40 so as to be digitized at the end of each time window T. If the signal occupies a bandwidth of B Hz which is also the suggested Nyquist sampling rate, the ADC sampling rate in the proposed scheme becomes (B/T) Hz. Thus, the j-th sensor node of FIG. 2 comprises $N_j$ parallel processing branches with each producing a measured autocorrelation at a specific time delay. The measured autocorrelations from all the branches can be written as a column vector $r_j$ of length $N_j$:

$$r_j = [r(n_1) \ldots r(n_{N_j})]^T \quad (9)$$

It is designed such that $r_j$ is a partial autocorrelation sequence taken from the full autocorrelation sequence r expressed in equation (1), and the measured $r_j$'s from all J sensor nodes constitute the full autocorrelation sequence of length N, i.e.:

$$r = [r_1^T \ldots r_J^T]^T \quad (10)$$

The number of branches $N_j$ may depend on the processing capability (e.g., hardware and power limitations) of each sensor node and is not necessarily the same for all sensor nodes, as long as:

$$\sum_{j=1}^{J} N_j = N. \quad (11)$$

In effect, the proposed spectrum sensing scheme distributes the burden of measuring an autocorrelation sequence of length N among J sensor nodes by letting each sensor node measure a partial autocorrelation sequence of length $N_j$. For instance, if the number of sensing nodes is equal to the length of the desired autocorrelation sequence to be estimated, i.e., J=N, each sensor node only needs one processing branch to measure the autocorrelation at one single time delay, which is a single coefficient, i.e., $r_j = r(j)$, j=1, ..., N.

The partial autocorrelation sequence $r_j$ is transformed in a transformation unit 50 to a partial compressive measurement sequence $y_j$ by applying a partial CS measurement matrix $\phi_j$. In matrix form, this can be expressed as follows:

$$y_j = \phi_j r_j \quad (12)$$

where $y_j$ is a vector of size M×1, and $\phi_j$ is a matrix of size M×$N_j$. The partial CS measurement matrix $\phi_j$ can be obtained at the transformation unit 50 by taking $N_j$ columns from a pre-defined CS measurement matrix:

$$\Phi = [\phi_1 \ldots \phi_J] \quad (13)$$

of size M×N containing random elements (e.g., Gaussian or ±1 Bernoulli).

Finally the sensor node transmits the partial compressive measurement sequence $y_j$ to a fusion center (FC) provided separately in the radio network or at a sensor node.

Figure 3:
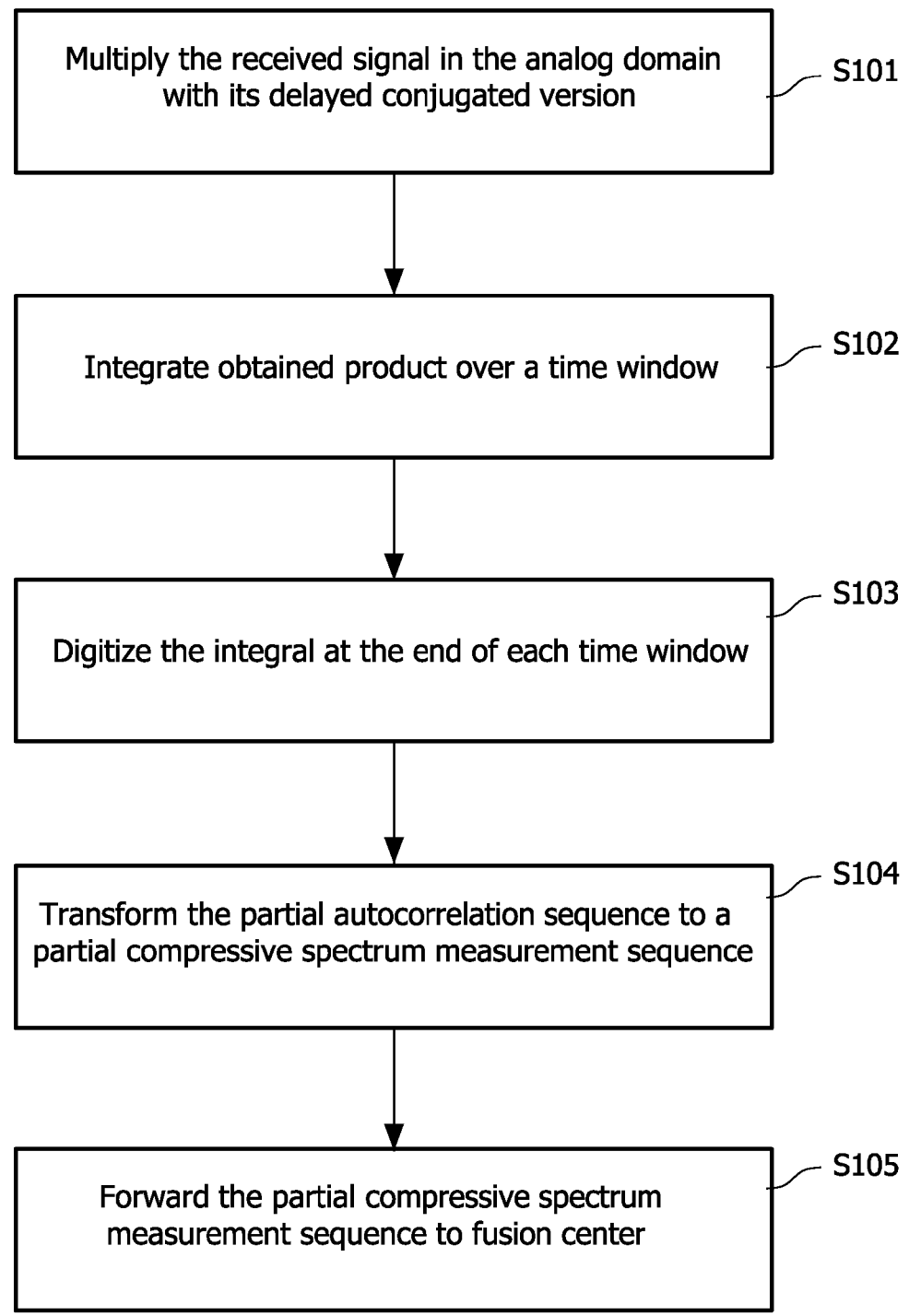
FIG. 3 shows a flow diagram of a spectrum sensing procedure according to a second embodiment.

FIG. 3 shows a flow diagram of spectrum sensing procedure according to a second embodiment, which may be implemented as a software routine controlling a processor or computer provide at a sensor node.

In step S101 a received signal is multiplied in the analog domain with at least one delayed conjugated version of respective specific delays. Then, in step S102, the multiplication results are integrated over a predetermined time window, and the integration outputs are analog-to-digital converted or digitized in step S103. In a subsequent step S104, the partial autocorrelation sequence obtained from all digitized integration outputs is transformed to a partial compressive measurement sequence, e.g., by using a CS measurement matrix. Finally, in step S105, the partial compressive measurement sequence is forwarded to a fusion center.

Figure 4:
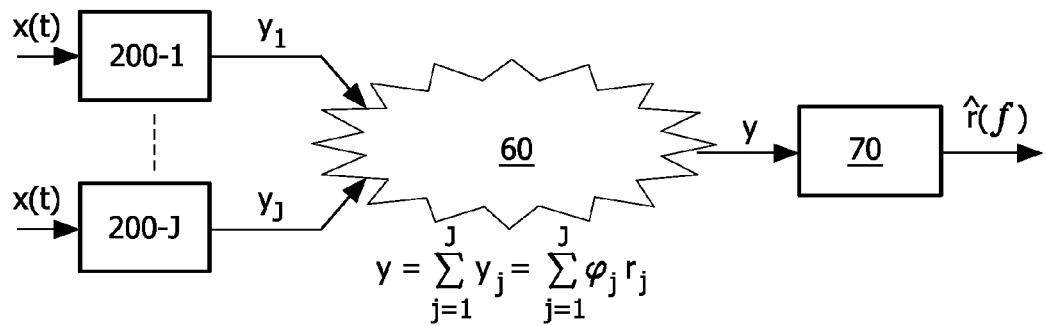
FIG. 4 shows a schematic block diagram of distributed spectrum sensing system according to a third embodiment.

FIG. 4 shows a block diagram of distributed spectrum sensing system according to a third embodiment. The individual and partial compressive measurement sequences $y_j$ are transmitted from sensor nodes 200-1 to 200-J to an FC 70. All the J sensor nodes 200-1 to 200-J may transmit their respective compressive measurement sequences $y_j$ to the FC 70 in an uncoded, analog and synchronized fashion over a narrowband wireless transmission channel 60 of bandwidth $W_c$ Hz at some carrier frequency $f_c \gg W_c$. Thus, the transmission channel 60 constitutes a coherent additive channel as described for example in W. Bajwa, J. Haupt, A. Sayeed, and R. Nowak, "Compressive Wireless Sensing", International Conference on Information Processing in Sensor Networks, April 2006. The transmission channel 60 automatically aggregates (i.e. coherently adds) the partial compressive measurement sequences $y_j$ during the synchronized transmission and the FC 70 receives a vector y equal to the sum of all partial compressive measurement sequences $y_j$. This can be expressed as follows:

$$y = \sum_{j=1}^{J} y_j = \sum_{j=1}^{J} \varphi_j r_j = [\varphi_1 \ldots \varphi_J] \begin{bmatrix} r_1 \\ \vdots \\ r_J \end{bmatrix} = \Phi r \quad (14)$$

Figure 5:
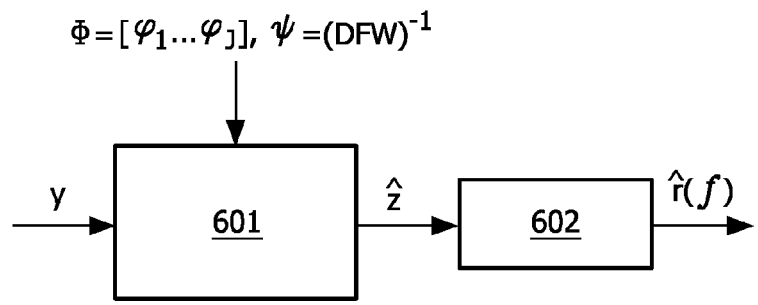
FIG. 5 shows a schematic block diagram of a fusion center processor according to a fourth embodiment.

FIG. 5 shows a schematic block diagram of an FC processor according to a fourth embodiment. The processor is configured to perform a processing of a distributed compressive wideband sensing scheme at the FC in a recovery block or part 601 and an integration block or part 602, which can be implemented as discrete processing blocks or as a software routine controlling the FC processor.

Given the sparse representation of r as defined in equation (8), the CS recovery problem can be expressed by $y = \Phi r = \Phi \Psi z$. Which $N_j$ columns of the matrix $\Phi$ are used by the sensor node j is pre-designed and known by the FC. The recovery part 601 of the FC can thus estimate the edge spectrum z (or the autocorrelation sequence r) from the received collected measurements y using a CS recovery algorithm (e.g., OMP as described for example in J. Tropp and A. Gilbert, "Signal recovery from random measurements via orthogonal matching pursuit", IEEE Transactions on Information Theory, pp 4655-4666, December 2007.). Ultimately, the total enhanced or full signal spectrum $r_f$ is to be estimated, which can be obtained at the integration part 602 by taking the Fourier transform of the autocorrelation sequence r. In the specific implementation example according to the fourth embodiment, given the definition of the edge spectrum z as the derivative of a smoothed version of the total spectrum $r_f$, an estimate of the total signal spectrum $r_f$ can be obtained in the integration block 602 directly from the recovered edge spectrum z by taking the cumulative sum over z which approximates the integration operation.

In summary, a spectrum sensing scheme for a radio network has been described. The proposed approach involves applying sensing in a distributed fashion to obtain an estimate of the signal spectrum. A network of the multiple sensing nodes obtains such a spectrum estimate without requiring high-speed analog-to-digital converter to accommodate the large bandwidth of interest.

It is noted that the present invention is not restricted to the above embodiments and can be applied for a variety of signal detection and estimation problems where the goal is to obtain coarse spectrum occupancy, for example in radio environment monitoring for interference detection in wireless hospitals, body sensor networks, portable devices, mobile terminals etc. Furthermore, the proposed further processing or compression on the partial autocorrelation sequence to obtain the partial compressive measurement sequence may be applied in the digital or analog domain.

Variations to the disclosed embodiments can be understood and effected by those skilled in the art, from a study of the drawings, the disclosure and the appended claims. In the claims, the word "comprising" does not exclude other elements or steps, and the indefinite article "a" or "an" does not exclude a plurality of elements or steps. A single processor or other unit may fulfill the functions of several items recited in the claims. The mere fact that certain measures are recited in mutually different dependent claims does not indicate that a combination of these measures cannot be used to advantage. A computer program used for controlling processor to perform the claimed features may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope thereof.

The invention claimed is:

1. An apparatus for sensing a spectrum for a radio network, said apparatus comprising:
   a correlator comprising:
      at least one branch having a multiplier performing a partial autocorrelation of a received signal, each of said at least one branch performing said partial autocorrelation at a corresponding specific delay, wherein said partial autocorrelation is performed by multiplying said received signal with its conjugated version delayed by said corresponding specific delay;
      transforming each of said autocorrelation associated with said at least one specific delay to a partial compressive measurement sequence, said transforming comprising:
         integrating each of said partial autocorrelation over a predetermined time window, and
         digitizing each of said integrated partial autocorrelation, wherein said digitization being at a rate based on a bandwidth of said received signal and said predetermined time; and
   a forwarder forwarding said partial compressive measurement sequence for collection at a fusion center.

2. The apparatus according to claim 1, wherein said partial compressive measurement sequence is transmitted over a coherent additive transmission channel.

3. The apparatus according to claim 1, wherein each branch of said at least one branch further comprises:
   an integrator integrating said partial autocorrelation over said predetermined time window, and
   an analog-to-digital converter digitizing the integrated partial autocorrelation at an end of said predetermined time window.

4. The apparatus according to claim 3, wherein said correlator further comprises:
   a compressive sensing processor:
      receiving said digitized integrated partial autocorrelations of said at least one branch; and
      applying a partial compressive sensing measurement to said digitized integrated partial autocorrelation.

5. A method of sensing a spectrum for a radio network, said method comprising:
   measuring a plurality of partial autocorrelation of a received signal at a plurality of specific delays, wherein each partial autocorrelation is measured by multiplying said received signal with its conjugated version delayed by a specific one of said plurality of specific delays;
   transforming said partial autocorrelation to a partial compressive measurement sequence, said transforming comprising:
      integrating each of said partial autocorrelation over a predetermined time window, and
      digitizing each of said integrated partial autocorrelation, wherein said digitization being at a rate based on a bandwidth of said received signal and said predetermined time; and
   forwarding said partial compressive measurement sequence for collection at a fusion center.

6. A system for sensing a spectrum for a radio network, said system comprising:
   at least two network nodes, said nodes comprising:
      a correlator:
         measuring a partial autocorrelation of a received signal, said partial autocorrelation being performed at at least one specific delay, wherein said partial autocorrelation is performed by multiplying said received signal with its conjugated version delayed by said at least one specific delay; and
         transforming each of autocorrelation associated with said at least one specific delay to a partial compressive measurement sequence comprising:
            integrating each of said partial autocorrelation over a predetermined time window, and digitizing each of said integrated partial autocorrelation, wherein said digitization being at a rate based on a bandwidth of said received signal and said predetermined time; and a forwarder forwarding said partial compressive measurement sequence for collection at a fusion center; and an apparatus comprising:

a receiver receiving a collection of partial compressive measurement sequences; and a transformation processor-recovering a total spectrum of said radio network from said received collection of partial compressive measurement sequences; and a fusion center.

7. The system according to claim 6, wherein a number of processing branches provided in said network nodes varies in dependence on a processing capability of the network node, and wherein a sum of all processing branches corresponds to a frequency resolution of said total spectrum.

8. A computer program product stored on a non-transitory medium, said computer program product comprising code means when run on a computer device executes the steps of:

measuring a partial autocorrelation of a received signal at a plurality of specific delays, each partial autocorrelation being performed at a specific one of said plurality of specific delays, wherein said partial autocorrelation is performed by multiplying said received signal with its conjugated version delayed by said at least one specific delay;

transforming each of said partial autocorrelations to a partial compressive measurement sequence, said transforming comprising:

integrating each of said partial autocorrelation over a predetermined time window, and digitizing each of said integrated partial autocorrelation, wherein said digitization being at a rate based on a bandwidth of said received signal and said predetermined time; and forwarding said partial compressive measurement sequence for collection at a fusion center.

* * * * *